United States Patent [19]

DeMartino et al.

[11] Patent Number: 4,915,491

[45] Date of Patent: * Apr. 10, 1990

[54] SIDE CHAIN LIQUID CRYSTALLINE ACRYLIC COPOLYMERS EXHIBITING NONLINEAR OPTICAL RESPONSE

[75] Inventors: Ronald N. DeMartino, Wayne; Hyun-Nam Yoon, New Providence; James B. Stamatoff, Westfield, all of N.J.

[73] Assignee: Hoechst Celanese Corporation, Somerville, N.J.

[*] Notice: The portion of the term of this patent subsequent to Apr. 18, 2006 has been disclaimed.

[21] Appl. No.: 915,179

[22] Filed: Oct. 3, 1986

Related U.S. Application Data

[63] Continuation-in-part of Ser. No. 822,090, Jan. 24, 1986, abandoned.

[51] Int. Cl.[4] .................. G02F 1/13; C09K 19/52; C08F 20/50
[52] U.S. Cl. .................. 350/330; 350/350 R; 350/350 S; 252/299.01; 252/589; 252/582; 428/1; 526/298; 526/311; 526/288
[58] Field of Search .............. 252/299.01, 582, 553, 252/589; 428/1; 350/350 R, 350 S, 330; 526/298, 311, 288

[56] References Cited

U.S. PATENT DOCUMENTS

| | | | |
|---|---|---|---|
| 4,293,435 | 10/1981 | Portugall et al. | 252/299.01 |
| 4,631,328 | 12/1986 | Ringsdorf et al. | 252/299.01 |
| 4,762,912 | 8/1988 | Leslie et al. | 252/299.01 |
| 4,822,865 | 4/1989 | DeMartino et al. | 252/299.01 |
| 4,835,235 | 5/1989 | DeMartino et al. | 526/311 |

OTHER PUBLICATIONS

Meredith et al., Macromolecules, vol. 15, pp. 1385–1389 (1952).
Shibaev et al., Eur. Polymer Journal, vol. 18, pp. 651–659 (1982).
Shibaev et al., Liquid Crystals Polymers II/III, pp. 215–220 (1984).

Primary Examiner—John F. Terapane
Assistant Examiner—J. E. Thomas
Attorney, Agent, or Firm—Depaoli & O'Brien

[57] ABSTRACT

This invention provides novel acrylic copolymers which exhibit nonlinear optical response, and which have utility as a transparent optical component in optical light switch and light modulator devices.

An invention side chain liquid crystalline polyvinyl polymer is illustrated by poly([6-(4-nitrobiphenyloxy)-hexyl methacrylate][ethyl acrylate]):

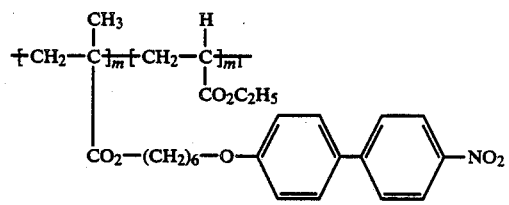

3 Claims, No Drawings

SIDE CHAIN LIQUID CRYSTALLINE ACRYLIC COPOLYMERS EXHIBITING NONLINEAR OPTICAL RESPONSE

This invention was made with Government support under Contract Number F49620-84-0110 awarded by the Department of Defense. The Federal Government has certain rights in this invention.

This patent application is a continuation-in-part of patent application Ser. No. 822,090, filed January 24, 1986, abandoned.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above recited publications are incorporated herein by reference.

Of more specific interest with respect to the present invention embodiments is prior art relating to side chain liquid crystalline polymers, such as the five articles published on pages 275–368 of "Polymeric Liquid Crystals", edited by A. Blumstein (Plenum Publishing Corporation, New York, 1985).

U.S. Pat. No. 4,293,435 describes liquid crystalline polymers corresponding to the formula:

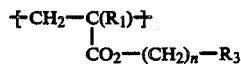

where $R_1$ is hydrogen or methyl, n is an integer from 1 to 6, and $R_3$ represents a structural element containing at least two phenylene groups.

Makromol, 179, 2541(1978) by H. Finkelmann et al describes a model consideration for liquid crystalline polymers which are prepared by the interaction of poly(acryloyl chloride) with mesogenic compounds such as p-aminobiphenyl.

Eur. Polym. J., 18, 651(1982) describes comb-like liquid crystalline polymers of the smectic and nematic types with cyanobiphenyl groups in the side-chain:

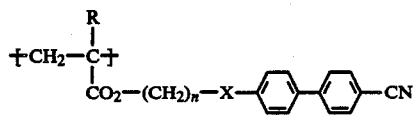

where R is hydrogen or methyl, n is an integer of 2–11, and x is an oxy, alkylene or carbonyloxy divalent radical.

Other publications which describe thermotropic liquid crystalline polymers with side chain induced crystallinity include Polymer, 25, 1342(1984); Eur. Polym. J., 21, No. 7, 645(1985); Polymer, 26, 615(1985); and references cited therein.

The above listed publications are incorporated herein by reference.

There is continuing interest in the theory and practice of liquid crystalline polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel liquid crystalline polymers.

It is another object of this invention to provide thermotropic liquid crystalline acrylic copolymers having mesogenic side chains which exhibit nonlinear optical response.

It is a further object of this invention to provide optical light switch and light modulator devices with a transparent polymeric nonlinear optical component comprising a thermotropic side chain liquid crystalline acrylic copolymer.

Other objects and advantages of the present invention shall become apparent from the accompanying description and examples.

The present patent application has subject matter related to the disclosures of copending patent application Ser. Nos. 822,092 U.S. Pat. No. 4,694,066; 822,093 U.S. Pat. No. 4,868,250 and 822,094 U.S. Pat. No. 4,835,235; filed January 24, 1986, respectively; and U.S. patent application Ser. No. 898,982, filed August 22, 1986, U.S. Pat. No. 4,795,664.

The disclosures of parent U.S. patent application Ser. No. 822,090, abandoned, and U.S. patent application Ser. No. 822,094, U.S. Pat. No. 4,835,235, are incorporated herein by reference.

DESCRIPTION OF THE INVENTION

One or more objects of the present invention are accomplished by the provision of a thermotropic liquid crystalline acrylic copolymer having a comb structure of mesogenic side chains which comprise at least about 25 weight percent of the copolymer, wherein the copolymer has a glass transition temperature above about 60° C., and the mesogens exhibit a second order nonlinear optical susceptibility $\beta$ of at least about $5 \times 10^{-30}$ esu as measured at 1.91 μm excitation wavelength.

In another embodiment this invention provides a liquid crystalline acrylic copolymer as defined above which contains mesogens which exhibit a third order nonlinear optical susceptibility $\gamma$ of at least about $1 \times 10^{-36}$ esu as measured at 1.91 μm excitation wavelength.

Illustrative of preferred liquid crystalline acrylic copolymers as defined above are those which exhibit a smectic or nematic mesophase.

In another embodiment this invention provides a transparent nonlinear optical medium which comprises a liquid crystalline acrylic copolymer as defined above. Illustrative of a transparent nonlinear optical medium is one comprising a liquid crystalline acrylic copolymer as defined above which is characterized by an external field-induced orientation of aligned mesogens. In another embodiment this invention provides a copolymer which is characterized by recurring monomeric units corresponding to the formula:

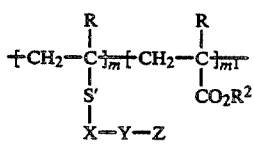

where m and $m^1$ are integers which total at least 10; R is hydrogen or a $C_1$-$C_4$ alkyl, $C_6$-$C_{10}$ aryl or halo substituent; S' is a flexible spacer group having a linear chain length of between about 1-25 atoms; X is $-NR^1-$, $-O-$ or $-S-$; $R^1$ is hydrogen or a $C_1$-$C_4$ alkyl group; $R^2$ is a $C_1$-$C_4$ alkyl group; Y is

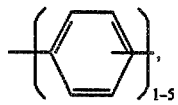

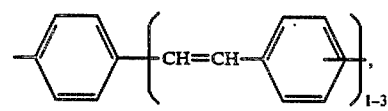

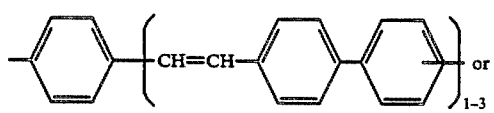

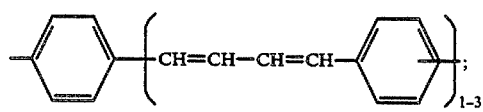

and

Z is an electron-donating group or an electron-withdrawing group.

Illustrative of $C_1$-$C_4$ alkyl substituents are methyl, ethyl, propyl, isopropyl, butyl, isobutyl, and the like.

Illustrative of $C_6$-$C_{10}$ aryl substituents are phenyl, tolyl, xylyl, methoxyphenyl, chlorophenyl, naphthyl, and the like.

Illustrative of halo substituents are chloro, bromo and fluoro atoms.

The term "electron-donating" as employed herein refers to organic substituents which contribute $\pi$-electrons when the conjugated electronic structure is polarized by the input of electromagnetic energy.

The term "electron-withdrawing" as employed herein refers to electronegative organic substituents which attract $\pi$-electrons when the conjugated electronic structure is polarized by the input of electromagnetic energy.

Illustrative of electron-donating Z groups are amino, alkyl, alkoxy, alkylthio, hydroxy, thiolo, acyloxy, vinyl, halo, and the like.

Illustrative of electron-withdrawing substituents as represented by Z in the above formula are nitro, haloalkyl, cyano, acyl, alkanoyloxy, alkoxysulfonyl, and the like.

In the above defined formula the acrylic comonomers usually will have a molar ratio $m:m^1$ which is in the range between about 0.5-5:1.

A present invention liquid crystalline acrylic copolymer can contain other vinyl comonomeric units in addition to the acrylate units. Illustrative of copolymerizable vinyl monomers are vinyl halide, vinyl carboxylate, acrylonitrile, methacrylonitrile, alkene, arylvinyl, and the like. Suitable vinyl monomers include vinyl chloride, vinyl acetate, ethylene, propylene, isobutylene, isoprene and styrene.

The additional vinyl comonomer or comonomers can be incorporated in a proportion up to about 50 molar percent of a present invention liquid crystalline acrylic copolymer.

A present invention liquid crystalline acrylic copolymer normally has a glass transition temperature above about 40° C., and a weight average molecular weight in the range between about 5000-200,000.

In another embodiment this invention provides a copolymer which is characterized by recurring monomeric units corresponding to the formula:

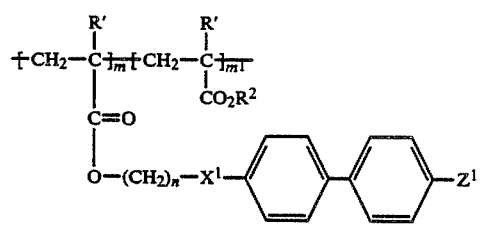

where R' is hydrogen, methyl, phenyl, tolyl, chloro or bromo; m and $m^1$ are integers which total at least 20; n is an integer between about 4-20; $X^1$ is $-NR^3-$, $-O-$ or $-S-$; $R^3$ is hydrogen or methyl; $R^2$ is a $C_1$-$C_4$ alkyl group; and $Z^1$ is $-NO_2$, $-CN$ or $-CF_3$.

A preferred acrylic copolymer of the present invention typically has a glass transition temperature above about 45°-50° C. and a weight average molecular weight in the range between about 10,000-200,000, and exhibits a smectic or nematic mesophase.

In another embodiment this invention provides a thermotropic liquid crystalline copolymer which is characterized by recurring comonomeric units corresponding to the formula:

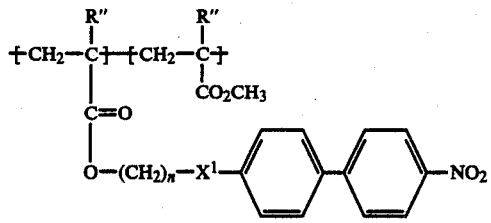

where R″ is hydrogen or methyl; n is an integer between about 4–20; $X^1$ is —$NR^3$—, —O— or —S—; $R^3$ is hydrogen or methyl; and where the copolymer has a glass transition temperature above about 80° C.

In another embodiment this invention provides a thermotropic liquid crystalline copolymer which is characterized by recurring comonomeric units corresponding to the formula:

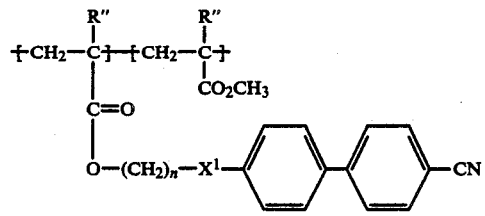

where R″ is hydrogen or methyl; n is an integer between about 4–20; $X^1$ is —$NR^3$—, —O— or —S—; $R^3$ is hydrogen or methyl; and where the copolymer has a glass transition temperature above about 50° C.

In another embodiment this invention provides an optical light switch or light modulator device with a polymeric nonlinear optical component comprising a transparent solid medium of a thermotropic liquid crystalline acrylic copolymer having a comb structure of mesogenic side chains which comprise at least about 25 weight percent of the polymer, wherein the polymer has a glass transition temperature above about 50° C., and the mesogens exhibit a nonlinear optical response of electronic origin.

An invention optical light switch or light modulator device typically will have a transparent solid medium of a thermotropic liquid crystalline acrylic copolymer which has a stable orientation of an external field-induced alignment of mesogens.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

Illustrative of a present invention optical device containing a polymeric nonlinear optical component as defined above is a laser frequency converter, an optical Pockels effect device, an optical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, or an optical parametric device.

Optical harmonic generating devices are described in Science, 216(1982); and in U.S. Pat. Nos. 3,234,475; 3,395,329; 3,694,055; 3,858,124; and 4,536,450.

Optical Kerr effect devices are described in U.S. Pat. Nos. 4,428,873 and 4,515,429; and references cited therein.

Degenerate four wave mixing optical devices are discussed by Y. R. Shen in Chapter 15, "The Principles of Nonlinear Optics"; John Wiley & Sons, New York (1984). A nonresonant degenerate four wave mixing mirror device is described by J. Feinberg et al in Optics Letters, 5(12), 519(1980).

An optical interferometric waveguide gate device is described by A. Lattes et al in IEEE J. Quantum Electron, QE-19(11), 1718(1983).

A wide-band electrooptical guided-wave analog-to-digital converter device is described by R. A. Becker et al in Proceedings Of The IEEE, 72(7), 802(1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280(1977) and in IEEE Spectrum, June 1981.

Optical parametric devices are described in U.S. Pat. Nos. 3,371,220; 3,530,301; and 3,537,020.

A present invention optical device can be achieved by constructing one of the optical devices described in the technical literature, except that a novel liquid crystalline acrylic copolymer is utilized as the nonlinear optical component as described herein.

SYNTHESIS OF LIQUID CRYSTALLINE POLYMERS

The preparation of a polyvinyl liquid crystalline acrylic copolymer with mesogenic side chains is illustrated by the following flow diagram:

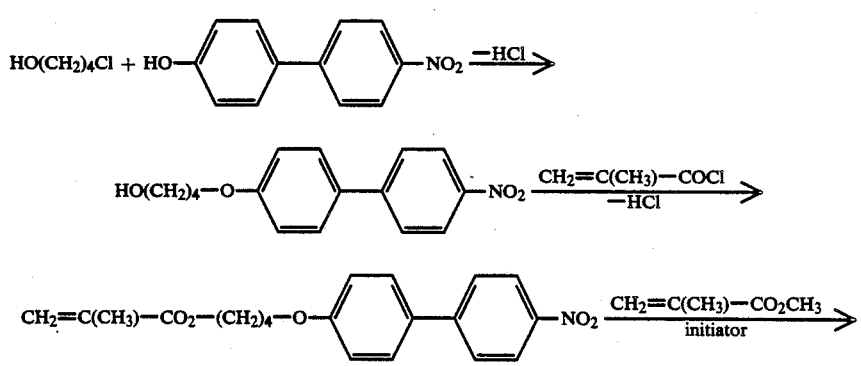

-continued

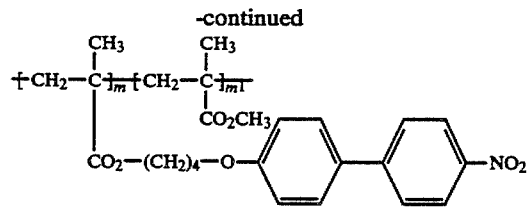

NONLINEAR OPTICAL PROPERTIES

The fundamental concepts of nonlinear optics and their relationship to chemical structures can be expressed in terms of dipolar approximation with respect to the polarization induced in an atom or molecule by an an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \quad (1)$$

$$P = P_0 + \chi^{(1)}E + \chi^{(2)}EE + \chi^{(3)}EEE + \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the dispersion as a function of wavelength, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\omega_3$$

where $n_1$ and $n_2$ are the indexes of refraction for the incident fundamental radiation, $n_3$ is the index of refraction for the created radiation, $\omega_1$ and $\omega_2$ are the frequencies of the incident fundamental radiation and $\omega_3$ is the frequency of the created radiation. More particularly, for second harmonic generation, wherein $\omega_1$ and $\omega_2$ are the same frequency $\omega$, and $\omega_3$ is the created second harmonic frequency, $2\omega$, the phase matching condition is expressed by the relationship:

$$n = n_{2\omega}$$

where $n_\omega$ and $n_{2\omega}$ are indexes of refraction for the incident fundamental and created second harmonic light waves, respectively. More detailed theoretical aspects are described in "Quantum Electronics" by A. Yariv, chapters 16–17 (Wiley and Sons, New York, 1975).

A present invention liquid crystalline polymer substrate typically is optically transparent and exhibits hyperpolarization tensor properties such as second harmonic and third harmonic generation, and the linear electrooptic (Pockels) effect. For second harmonic generation, the bulk phase of the liquid crystalline polymer substrate whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear substrates.

In the case of macroscopic nonlinear optical substrates that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\omega_3;\omega_1,\omega_2) = Nf^{\omega_3}f^{\omega_2}f^{\omega_1}\langle\beta_{ijk}(-\omega_3;\omega_1,\omega_2)\rangle$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

EXTERNAL FIELD INDUCED LIQUID CRYSTAL ORIENTATION

The term "external field" as employed herein refers to an electric, magnetic or mechanical stress field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial. The parameter ranges from $-0.5$ to $1.0$ ($1.0$ corresponds to perfect uniaxial alignment along a given axis. $0.0$ corresponds to random orientation, and $-0.5$ corresponds to random orientation confined in a plane perpendicular to a given axis).

The order parameter thus defined does not distinguish between parallel and antiparallel alignment. Thus, a sample of asymmetric rod-like molecules would have an order parameter of $1.0$ for both the case in which the molecules are colinear and all pointed in the same direction, and the case in which the molecules are colinear and form antiparallel pairs.

The application of an orienting external field to an array of nematic liquid crystal molecules results in an order parameter of approximately $0.65$. Deviations from ideal order are due to nematic fluctuations on a micron length scale which accommodate characteristic defects. These fluctuations may be dynamic for small molecule liquid crystals or frozen for polymeric liquid crystals. In either case, nematic fluctuations scatter light so that aligned samples appear to be hazy (particularly in a thick sample).

Smectic liquid crystals may be aligned by application of an orienting external field, with a resulting order parameter exceeding $0.9$. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientational order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not posses a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material. Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a liquid crystalline surface with an aligning polymer such as nylon. Physical methods (e.g., stretching) rely upon the rigid and geometrically asymmetric character of certain liquid crystalline molecules to induce bulk orientation. Chemical methods (e.g., coating the surface with an aligning polymer) rely upon strong intermolecular interactions to induce surface orientation. All of the methods described above to produce oriented materials apply to both small molecule liquid crystals and polymeric liquid crystals. For polymers which possess a glass transition, the aligned liquid crystalline phase can be frozen by rapid cooling below the glass transition temperature.

Application of an AC electric, magnetic or mechanical external field produces colinear molecular alignment in which the molecular direction (either parallel or antiparallel to the orientation axis) is statistically random, and the resultant molecularly oriented medium exhibits third order nonlinear optical susceptibility $\chi^{(3)}$. Application of a DC electric external field produces colinear molecular alignment in which the molecular direction is not random, and is characterized by a net parallel alignment of molecular dipoles. The resultant molecularly oriented medium exhibits second order nonlinear optical susceptibility $\chi^{(2)}$.

Publications relating to external field-induced liquid crystal molecular orientation include The Physics of Liquid Crystals, P.G. deGennes, p. 95-97, Oxford University Press, 1974; J. Stamatoff et al, "X-Ray Diffraction Intensities of a Smectic-A Liquid Crystal", Phys. Rev. Letters, 44, 1509-1512, 1980; J. S. Patel et al, "A Reliable Method of Alignment for Smectic Liquid Crystals", Ferroelectrics, 59, 137-144, 1984; J. Cognard, "Alignment of Nematic Liquid Crystals and Their Mixtures", Mol. Cryst. Liq. Cryst.:Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of poly([6-(4-nitrobiphenyloxy)hexyl methacrylate][ethyl methacrylate]) in accordance with the present invention:

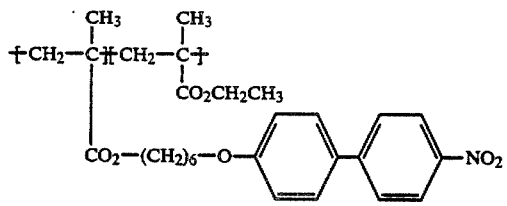

A. 4-Hydroxy-4'-nitrobiphenyl (1) 4-benzoyloxybiphenyl

To 500 ml of pyridine in a 1000 ml three necked flask is added 170 g of 4-hydroxybiphenyl. The mixture is cooled to 10° C., and 155 g of benzoyl chloride is added dropwise while keeping the mixture temperature below 20° C. After complete addition, the mixture is heated gradually to reflux and maintained at this temperature for 30 minutes. The reaction mixture is then cooled to room temperature.

The solidified product subsequently is admixed with 250 ml HCl and 250 ml water, then additional HCl and water are added and the slurry is mixed thoroughly in a blender. The particulate solid is filtered, washed with water to a neutral pH, and air-dried overnight. The crude product is recrystallized from n-butanol, mp 149°-150° C.

(2) 4-benzoyloxy-4'-nitrobiphenyl

4-Benzoyloxybiphenol (40 g) is mixed with 310 ml of glacial acetic acid and heated to 85° C. Fuming nitric acid (100 ml) is added slowly while maintaining the reaction medium temperature between 85°-90° C. After complete addition, the reaction is cooled to room temperature.

The resultant solid is filtered and washed with water and methanol. The crude product is recrystallized from glacial acetic acid, mp 211°-214° C.

(3) 4-Hydroxy-4'-nitrobiphenyl

4-Benzoxyloxy-4'-nitrobiphenyl (60 g) is mixed with 300 ml of ethanol and heated to reflux. A solution of 40 g KOH in 100 ml of water is added dropwise at reflux. After complete addition, the mixture is refluxed 30 minutes and cooled overnight. The resultant blue crystalline potassium salt is filtered and dried.

The dried salt is dissolved in a minimum amount of boiling water, and a 50/50 HCl/water solution is added until an acidic pH is obtained. The crude yellow product is filtered and washed with water until neutral, and then recrystallized from ethanol, mp 203°-204° C.

B. 4-(6-Hydroxyhexyloxy)-4'-nitrobiphenyl

To 400 ml of ethanol is added 21.5 g of 4-hydroxy-4'-nitrobiphenyl and the mixture is heated to reflux. A solution of 7.1 g of KOH in 30 ml of water is added dropwise at reflux temperature. After complete addition, a 21.7 g quantity of 6-bromohexanol is added, and the reaction medium is refluxed about 15 hours. Then the reaction medium is cooled and the ethanol is removed in a rotary evaporator.

The solid residue is slurried with water in a blender, and the particulate solid is filtered, washed with water, and air dried. The crude product is recrystallized from ethanol, mp 117°-119° C.

C. 4-(6-Methacryloxyhexyloxy)-4'-nitrobiphenyl 4-(6-Hydroxyhexyloxy)-4'-nitrobiphenyl (22 g) is dissolved in 500 ml of dry dioxane and heated to 45° C. A 14 g quantity of triethylamine is added, then a solution of 10.5 g of methacryloyl chloride in an equal volume of dioxane is added dropwise while maintaining the reaction medium temperature at 45° C.

The reaction medium is stirred at 45° C. for about 24 hours. The dioxane then is removed under vacuum, and the solid residue is slurried in water in a blender. The particulate solid is filtered, washed with water, and air dried. The crude monomer product is recrystallized from ethanol, mp 53°-56° C.

D. Poly([6-4-nitrobiphenyloxy)hexyl methacrylate][ethyl methacrylate])(75/25)

The monomer as prepared in C. (2 g, 0.005M) is dissolved in 20 ml of degassed benzene in a reactor, and ethyl methacrylate (0.194 g, 0.0017M) and 1 mole percent of azodiisobutyronitrile are added to the reaction medium. The reactor is heated at 60° C. for 4 days. During this period, polymer product separates from the reaction medium. After the polymerization is completed, the polymer is recovered by precipitation in methanol solvent in a blender. The solid polymer is filtered, washed with methanol, and vacuum dried.

The polymer has a glass transition temperature in the range of 50°-60° C.

EXAMPLE II

This Example illustrates the preparation of poly([6-(4-nitrostilbeneoxy)hexyl methacrylate][methyl methacrylate].

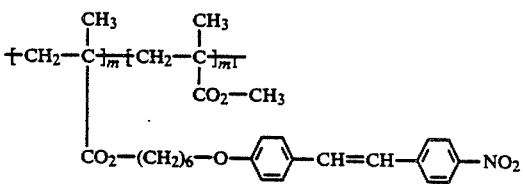

A. 4-Hydroxy-4'-nitrostilbene

A 54.3 g quantity of 4-nitrophenylacetic acid is charged to a 500 ml three necked flask which is fitted with a mechanical stirrer, dropping funnel and argon inlet. To the flask contents is slowly added 25.6 g of piperidine. After complete addition, the dropping funnel is removed and replaced with a condenser. To the flask mixture is added 36.6 g of 4-hydroxybenzaldehyde which previously has been recrystallized from water and charcoal.

The reaction mixture is heated for 3 hours at 100° C., 3 hours at 150° C., and cooled overnight. The resultant solid product mixture is charged to a one liter beaker with 500 ml of 30% NaOH. After boiling for 30 minutes, the solution is cooled to room temperature and the formed solid is filtered. The crude solid then is added to a 4 liter beaker with 3 liters of water and neutralized slowly with dry ice. The orange solid is filtered, washed with water until the wash is colorless, and air dried. The crude product is recrystallized from acetic acid with charcoal, mp 204°–206° C.

The potassium salt is prepared by dropwise addition of 10 g of KOH in 75 ml of water to a refluxing solution of 36 g of 4-hydroxy-4'-stilbene in 900 ml of ethanol. Upon cooling, blue crystals of the potassium salt separate. The crystalline salt is filtered and washed with tetrahydrofuran until the wash is colorless, to yield 41 g of 4-hydroxy-4'-nitrostilbene potassium salt product.

B. 4-(6-Hydroxyhexyloxy)-4'-nitrostilbene

To 500 ml of toluene in a 1000 ml round bottom flask, fitted with a condenser and magnetic stirrer, are added 14 g (0.05M) of 4-hydroxy-4'-nitrostilbene potassium salt, 14 g of 6-iodo-1-hexanol, and 0.5 g of 18-crown-6 ether. The mixture is refluxed for about 10 hours, and the solution is filtered hot and the product crystallizes from the toluene solution on cooling, mp 154°–157° C.

C. 4-(6-methacryloxyhexyloxy)-4'-nitrostilbene

To 500 ml of dry dioxane in a reaction flask are added 9.0 g of 4-(6-hydroxyhexyloxy)-4'-nitrostilbene and 5 g triethylamine. The solution is heated to 50° C., and 3.7 g of methacryloyl chloride is added dropwise. The reaction is stirred at 45°–50° C. for about 6 hours and an additional 3.7 g of methacryloyl chloride is added. The reaction mixture is stirred for about 10 hours at 50° C., the dioxane is removed and the resultant residue is slurried with water in a blender. The solid is filtered, washed with water, and dried. The crude product is recrystallized from ethanol, mp 90°–95° C.

D. Poly([6-(4-nitrostilbeneoxy)hexyl methacrylate][methyl methacrylate])(75/25)

To 10 ml of dry toluene in a reaction flask are added 1 g (0.0024M) of 4-(6-methacryloxyhexyloxy)-4'-nitrostilbene and 0.08 g (0.0008M) of methyl methacrylate as a 10% solution (0.8 ml). The solution is purged with argon for 1 hour, then 2 ml of a 1% azodiisobutyronitrile solution is added and the flask immersed in an oil bath held at 60° C. for about 20 hours. The resultant polymer suspension is poured into methanol in a blender. The polymer is filtered, washed with methanol, and dried. The polymer exhibits a nematic phase, and a glass transition temperature of 65°–66° C. A homopolymer of 4-(6-methacryloxyhexyloxy)-4'-nitrostilbene is nematic, and has a glass transition temperature of 45° C.

Following the above described procedures, 4-(11-hydroxyundecyloxyl-4'-nitrostilbene (mp 116°–117° C.) is prepared from 11-bromo-1-undecanol, and then converted to 4-(11-methacryloxyundecyloxy)-4'-nitrostilbene, mp 102°–103° C. Under polymerization conditions, a (75/25) poly([11-(4-nitrostilbeneoxy)undecyl methacrylate][methyl methacrylate]) polymer is prepared. The polymer exhibits a smectic mesophase.

EXAMPLE III

This Example illustrates the preparation of acrylic-styrene copolymers and terepolymers.

The procedure of Example II(D) is followed, except that 0.083 g of styrene is employed as the comonomer, yielding a 75/25 copolymer of 4-(6-methacryloxyhexyloxy)-4'-nitrostilbene and styrene.

Following the same procedure, a 75/25 copolymer of 4-(11-methacryloxyundecyloxy)-4'-nitrostilbene and styrene is prepared.

Employing the same procedure, the following terepolymers are prepared:
(75/12.5/12.5) 4-(6-methacryloxyhexyloxy)-4'-nitrostilbene/methyl methacrylate/styrene; and
(75/12.5/12.5) 4-(11-methacryloxyundecyloxy)-4'-nitrostilbene/methyl acrylate/styrene.

EXAMPLE IV

This Example illustrates a poling procedure for producing a transparent film of a side chain liquid crystalline acrylic copolymer which exhibits second order nonlinear optical response in accordance with the present invention.

A. Poling Cell Construction

A poling cell is constructed from electrically conductive glass plates, such as Corning Glass EC-2301. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness. A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B. Filling The Poling Cell

Poly([6-(4-nitrobiphenyloxy)hexyl methacrylate]-[ethyl methacrylate] of Example I is placed in a vacuum oven and maintained in a melt phase at a temperature of about 120° C. for about 4 hours to eliminate entrained air bubbles from the polymer melt.

The liquid crystalline polymer melt is introduced into the space between the glass plates by charging a drop of the polymer melt to one of the openings of the poling cell space and placing the cell assembly in a vacuum oven maintained at a temperature approximately 10° C. above the clearing temperature of the liquid crystalline polymer. The cell space fills gradually by capillary action. The space filling period is about 4 hours for a 0.5 cm long space. The liquid crystalline polymer melt in the filled cell is bubble-free.

C. Electric Field Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifies the voltage signal from a signal generator(Hewlett-Packard No. 3310B).

The poling cell first is heated to 85° C. to bring the liquid crystal polymer to the isotropic phase. The assembly then is cooled at a rate of 0.2° C./min. until it reaches 64° C. At this temperature, the photodiode signal registers an abrupt increase which indicates that the melt has undergone a transition into a liquid crystalline phase. The temperature is further lowered by 2° C. and then maintained at this temperature.

The AC voltage source is set at 500 V, and the frequency is set at 2000 Hz. The power to the poling cell is turned on to apply an electric field across the liquid crystalline sample. The field strength is calculated to be approximately $2 \times 10^5$ V/cm. About three seconds after the electric field is applied, the photodiode signal drops close to the baseline, indicating that orientation development induced by the electric field is completed. At this point, the cooling is resumed until the temperature reaches 35° C., and the poling assembly is disconnected from the power source.

When the poling assembly is removed from the microscope hot stage, by visual observation the liquid crystalline polymer in the cell space is transparent. This is an indication that the molecular orientation is uniform and homogeneous throughout the sample. Orientation of the sample is further ascertained utilizing a wide angle X-ray diffraction technique, and the Hermann's orientation factor of the sample is approximately 0.9. These oriented materials possess no net alignment of molecular dipoles along the electric field even though the molecular axis is oriented along the field axis. Antiparallel packing of molecular dipoles produces a center of inversion symmetry so that the materials exhibit third order nonlinear optical susceptibility $\chi^{(3)}$.

D. High Field Poling For Symmetry Control

The oriented liquid crystal sample is subjected further to a higher electric field to develop a noncentrosymmetric orientation of nonlinear optical moieties which are a part of the side chains of the polymer.

The poling cell assembly is heated to 60° C., which is approximately 5° C. below the glass transition temperature of the polymer. Then the lead wires of the poling assembly are connected to a DC voltage source (Kepco OPS-3500) and the voltage is turned up until it reaches 2000 V. At this point, the electric field strength across the sample is about $8 \times 10^5$ V/cm. The sample is maintained at this field strength level for a period of about one second or longer as necessary to achieve the molecular alignment, and then the voltage source is disconnected. A noncentrosymmetrically oriented liquid crystalline polymer matrix is obtained when the cell sample is cooled.

The noncentrosymmetry and orientation of the sample is determined from the X-ray diffraction measurement and the thermally stimulated electrical discharge measurement. The Hermann's orientation function from the X-ray measurement is approximately 0.9.

From the measurements, there is an indication that a major proportion of the nonlinear optical moieties are aligned parallel to the electric field direction, and the rest are oriented antiparallel to the electric field direction.

What is claimed is:

1. An optical light switch or light modulator device with a polymeric nonlinear optical component comprising a transparent solid medium of a copolymer which is characterized by recurring monomeric units corresponding to the formula:

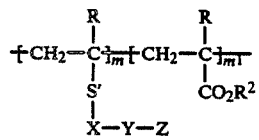

where m and $m^1$ are integers which total at least 10; R is hydrogen or a $C_1$–$C_4$ alkyl, $C_6$–$C_{10}$ aryl or halo substituent; S' is a flexible spacer group having a linear chain length of between about 1-25 atoms; X is —$NR^1$—, —O— or —S—; $R^1$ is hydrogen or a $C_1$–$C_4$ alkyl group; $R^2$ is a $C_1$–$C_4$ alkyl group; Y is

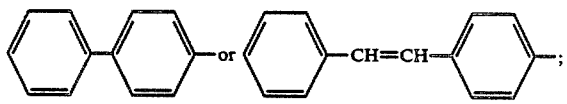

and Z is a nitro group; and wherein the copolymer has a stable orientation of an external field-induced alignment of mesogens.

2. An optical device in accordance with claim 1 wherein the copolymer component is poly([6-(4-nitrostilbeneoxy)hexyl methacrylate][methyl methacrylate]).

3. An optical device in accordance with claim 1 wherein the copolymer component is poly([6-(4-nitrobiphenyloxy)hexyl methacrylate][ethyl methacrylate]).

* * * * *